United States Patent [19]
Shelton et al.

[11] Patent Number: 5,208,907
[45] Date of Patent: May 4, 1993

[54] METHOD FOR GENERATING A DISPLAY UTILIZING OBJECTS IN AN OBJECT LIST

[75] Inventors: Richard E. Shelton, Mesa; Ronald E. Norden-Paul, Tempe; Audree A. Thurman, Phoenix; Stanley C. Person, Mesa, all of Ariz.

[73] Assignee: Emtek Health Care Systems, Inc., Tempe, Ariz.

[21] Appl. No.: 540,382

[22] Filed: Jun. 19, 1990

Related U.S. Application Data

[63] Continuation of Ser. No. 322,740, Mar. 13, 1989, abandoned.

[51] Int. Cl.$^5$ .............................................. G06F 15/20
[52] U.S. Cl. ...................................... 395/149; 395/155
[58] Field of Search ............ 364/401, 403, 406, 413.02, 364/413.03, 523, 200, 900; 235/385; 395/149, 155-161

[56] References Cited

U.S. PATENT DOCUMENTS

| | | | |
|---|---|---|---|
| 3,588,838 | 6/1971 | Felcheck | 340/172.5 |
| 4,258,361 | 3/1981 | Hydes et al. | 340/721 |
| 4,315,309 | 2/1982 | Coli | 364/200 |
| 4,484,302 | 11/1984 | Cason et al. | 364/900 |
| 4,555,775 | 11/1985 | Pike | 364/900 |
| 4,597,045 | 6/1986 | Kiuchi | 364/406 |
| 4,651,146 | 3/1987 | Lucash et al. | 340/721 |
| 4,653,020 | 3/1987 | Cheselka et al. | 364/900 |
| 4,658,366 | 4/1987 | Posh | 364/523 |
| 4,737,912 | 4/1988 | Ichikawa | 364/413.02 |
| 4,761,642 | 8/1988 | Huntzinger | 340/721 |
| 4,807,123 | 2/1989 | Komatsu et al. | 364/200 |
| 4,837,693 | 6/1989 | Schotz | 364/401 X |
| 4,851,999 | 7/1989 | Moriyama | 364/401 |
| 4,878,175 | 10/1989 | Norden-Paul et al. | 364/401 X |

OTHER PUBLICATIONS

*Using 1-2-3 Special Edition*, Que Corp., 1987, pp. 12-35, 46-56-66-69, 78-80, 98-101, 274-278 and 756-757.

Foley and Van Dam, *Fundamentals of Interactive Computer Graphics*, 1982, pp. 55-61 and 222-234.

Poole, Lon, *Your Atari Computer*, Osborne/McGraw-Hill, 1982, pp. 405-411.

Butterworth, "Forms Definition Method", 5th Phoenix Conference on Computers and Communications Mar. 26-28, 1986.

Meyers, "A Taxonomy of Window Manager User Interfaces", IEEE Computer Graphics & Applications, pp. 65-84 (Sep. 1988).

Scheifler et al., "The X Window System", ACM Transactions on Graphics, vol. 5, No. 2, pp. 79-109 (Apr. 1986).

*Primary Examiner*—Heather R. Herndon
*Attorney, Agent, or Firm*—Walter W. Nielsen; Harold C. McGurk, IV

[57] ABSTRACT

Input to the system is buffered by the forms manager to determine access to the tile/region and to check entered data. The tile/region will retain various information such as data entered, user, time, changes, etc. To display a form, the forms manager obtains a list of objects to be displayed. This list of objects is then edited to remove objects which are not utilized and to place the remaining objects in a prioritized order. The forms manager then generates the display.

11 Claims, 10 Drawing Sheets

| | | 7/7 10:00 | 7/7 10:30 | 7/7 11:00 | 7/7 11:30 | 7/7 12:00 | 7/7 12:30 | 7/7 13:00 |
|---|---|---|---|---|---|---|---|---|
| VITALS (51) | HEART RATE | 53A→ 54A | 53B— 53C | | 53C | 53C | | |
| | BLOOD PRESSURE | | 54B | 54C | | 54C | 54C | |
| | TEMP. | | | | | | | |
| | RESPIRATION RATE | | | | | | | |
| LABS (52) | CBC HGB | | | | | | | |
| | CBC HCT | | | | | | | |
| | 59B K+ | | | | 59C | | | 59C |
| | 60B Na | | 60C | 60C | | | 60C | |
| | BUN | | | | | | | |
| | CREAT | | | | | | | |

FIG. 3

| | VITALS | 54'A | |
|---|---|---|---|
| 7/7 10:00 | HEART RATE | BLOOD PRESSURE | TEMP. |
| 7/7 10:30 | 53'B  53'C | 54'B | |
| 7/7 11:00 | | 54'C | |
| 7/7 11:30 | 53'C | | |
| 7/7 12:00 | 53'C | | |
| 7/7 12:30 | | 54'C | |
| 7/7 13:00 | | | |
| 7/7 13:30 | | 54'C | |
| 7/7 14:00 | | | |
| 7/7 14:30 | | | |
| 7/7 15:00 | | | |
| 7/7 15:30 | | 54'C | |
*FIG. 4*
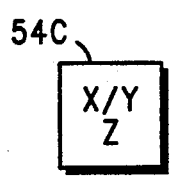
*FIG. 5A*
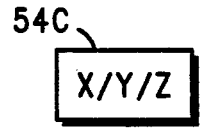
*FIG. 5B*
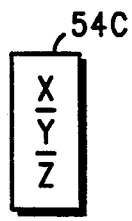
*FIG. 5C*

| | | 7/7 10:00 | 7/7 10:30 | 7/7 11:00 | 7/7 11:30 | 7/7 12:00 | 7/7 12:30 | 7/7 13:00 | | | |
|---|---|---|---|---|---|---|---|---|---|---|---|
| VITALS | HEART RATE 53A→ 54A | | 53B⌐ 53C | | 53C | 53C | | | | | |
| | BLOOD PRESSURE | | ⌐54B | 54C | | 54C | 54C | | | | |
| | TEMP. | | | 65 | | | | | | | |
| | RESPIRATION RATE | | | | | | | | | | |
| LABS | CBC HGB | | | | | | | | | | |
| | CBC HCT | | | | | | | | | | |
| | 59B K+ | | | | 59C | | | 59C | | | |
| | 60B Na | | 60C | 60C | | | 60C | | | | |
| | BUN | | | | | | | | | | |
| | CREAT | | | | | | | | | | |

Columns: 53, 54, 55, 56, 57, 58, 59, 60, 61, 62

Popup (70):
(1) MAKE ENTRY
(2) CORRECT ENTRY
(3) SHOW DETAIL
(4)
(5)
(6)
(7)

FIG. 6    50

| | 7/7 10:00 | 7/7 10:30 | 7/7 11:00 | 7/7 11:30 | 7/7 12:00 | 7/7 12:30 | 7/7 13:00 |
|---|---|---|---|---|---|---|---|
| VITALS 53A 54A | | | | | | | |
| HEART RATE 53B | | 53C | | 53C | 53C | | |
| BLOOD PRESSURE 54B | | | 54C | | 54C | 54C | |
| RESPIRATION RATE | | | | | | | |
| LABS | | | | | | | |
| 59B K+ | | | | 59C | | | 59C |
| 60B Na | | | 60C | | | 60C | |
| 61B BUN | | | | | | | |
| 62B CREAT | | | | | | | |

FIG. 8

| | | 7/7 10:00 | 7/7 10:30 | 7/7 11:00 | 7/7 11:30 | 7/7 12:00 | 7/7 12:30 | 7/7 13:00 |
|---|---|---|---|---|---|---|---|---|
| VITALS | BLOOD PRESSURE | 54B | | 54C | | 54C | 54C | |
| LABS | K+ | 59B | | | 59C | | | |
| LABS | Na | 60B | 60C | 60C | | | 60C | |
| VITALS | HEART RATE | 53B | 53C | | 53C | 53C | | |
| VITALS | RESPIRATION RATE | | | | | | | |
| LABS | BUN | 61B | | | | | | |
| LABS | CREAT | 62B | | | | | | |

FIG. 9

METHOD FOR GENERATING A DISPLAY UTILIZING OBJECTS IN AN OBJECT LIST

This application is a continuation of prior application Ser. No. 07/322,740, filed Mar. 13, 1989, now abandoned.

RELATED INVENTIONS

The present invention is related to the following inventions, all assigned to the assignee of the present invention:

System Control Structure of a Hospital Information System and Method of Using Same, invented by John Brimm et al., having U.S. Ser. No. 116,614, and filed on Nov. 3, 1987, U.S. Pat. No. 4,878,175;

Method for Generating Patient-Specific Flowsheets by Adding/Deleting Parameters, invented by Ronald Norden-Paul et al., having U.S. Ser. No. 116,611, and filed on Nov. 3, 1987;

Medical Information System With Automatic Updating of Task List In Response to Charting Interventions On Task List Window Into An Associated Form invented by John Brimm et al., having U.S. Ser. No. 268,822, and filed on Nov. 7, 1988, now U.S. Pat. No. 5,077,666;

Clinical Task List with Charting onto Underlying Form and Automatic Updating of Task List, invented by John Brimm et al., having U.S. Ser. No. 268,323, and filed Nov. 7, 1988, now U.S. Pat. No. 5,072,383;

A Method for Displaying Information from an Information Based Computer System, having Ser. No. 07/407,979 and filed on Sep. 15, 1989;

Spreadsheet Cell having Multiple Data Fields, having Ser. No. 07/408,166 and filed on Sep. 15, 1989;

A Method for Displaying Information from an Information Based Computer System, having Ser. No. 07/407,836 and filed on Sep. 15, 1989;

Electronic Data Storage Interface, having Ser. No. 07/408,178 and filed on Sep. 15, 1989;

Method for Updating Data in a Database, having Ser. No. 07/408,167 and filed on Sep. 27, 1989;

Method for Storing a Transaction in a Distributed Database System, having Ser. No. 07/408,169 and filed on Sep. 15, 1989;

A Method of Forming a Spreadsheet Display, having Ser. No. 07/407,972 and filed on Sep. 15, 1989; and Data Storage Audit Trail, having Ser. No. 07/409,230 and filed on Sep. 15, 1989.

BACKGROUND OF THE INVENTION

The present invention relates, in general, to a process of controlling the input and output of data in a computing system and, more particularly, to a process of managing the form of input and output with the use of tiles consisting of one or more cells.

In the art, there are various types of input and output buffers. However, this is typically handled using two different buffers, one for inputs and one for outputs. A typical input is generated by some type of user interface such as a keyboard, mouse, track ball, or the like. The output is typically provided on a cathode ray tube (CRT), flat screen display, or like device generally classified as operator display modules (ODM)

The output function of a forms manager is to take the information to be displayed and arrange it in the order dictated by a form. In prior art forms managers, the form of the output is predetermined and stored somewhere in the system. The forms manager does not have the capability to modify the form dependent upon the user or information being displayed.

These types of prior art forms managers have the disadvantage of having to display an information field whether the field is used or not. By way of one specific example, in the area of medical records, there are numerous types of information that can be maintained for any one particular patient However, rarely does one patient require that all of the types of information be maintained. Therefore, it is a disadvantage for the forms manager to display blank spaces when that particular area is not being monitored. By displaying these blank areas, the size of the display is greatly increased making it impossible to display all of the information on one or two screens There may also be screen displays that have no data on them.

In addition, it is often necessary, for record keeping and security, to: limit access to particular portions of the display; keep track of who enters the data; and to insure that the data is entered correctly. Therefore, there is a requirement in the industry that the forms manager also interact with the input side of the systems.

Accordingly, it is an object of the present invention to provide a forms manager which overcomes the above deficiencies.

It is a further object of the present invention to provide a forms manager that acts as an input and output buffer.

Another object of the present invention is to provide a forms manager which customizes the form to the information being displayed.

Still another object of the present invention is to provide a forms manager which utilizes tiles, or windows, to display information.

Yet another object of the present invention is to provide a forms manager which may be used to provide data entry and access security to tiles Another object of the present invention is to provide a forms manager which operates independently of the applications allowing the forms to be modified without requiring a change in the application.

SUMMARY OF THE INVENTION

A particular embodiment of the present invention consists of a forms manager which first obtains a list of objects to be displayed. The tiles associated with these objects are then obtained from a data base of various tiles. The tiles, and associated objects, are then ranked in order for display. Finally, the tiles and their associated objects and data are displayed.

BRIEF DESCRIPTION OF THE DRAWINGS

FIG. 3 is a graphical representation of a display generated by a process embodying the present invention;

FIG. 4 is a graphical representation of an second display generated by a process embodying the present invention;

FIGS. 5A–5C are graphical representations of alternative cell displays in FIGS. 3 and 4;

FIG. 6 is a graphical representation of a display generated by a process embodying the present invention illustrating the pop-up menu function;

FIG. 8 is a graphical representation of a third display generated by a process embodying the present invention;

FIG. 9 is the display of FIG. 7 after being prioritized by a process embodying the present invention.

DETAILED DESCRIPTION OF THE DRAWINGS

As used herein, the term "tile" will refer to a set of rules for displaying data of an object and a list of objects that it may display. A "group" is a collection of related tiles and a "form" is a collection of groups and/or tiles.

A tile is comprised of "cells" each cell having a related "object". The object may be either text, numerical, or a combination thereof. A tile is similar to a window with the exception that tiles do not overlap as is permitted with windows. It should be understood that, if the application permits, the present invention may be utilized with windows and as such the term tile may be taken as synonymous with window. A description of windows is provided in Scheiflen & Gettys, "The X Window System", ACM Transactions on Graphics, Vol. 5, No. 2, pg. 79-109 (April 1986).

Figure 1:
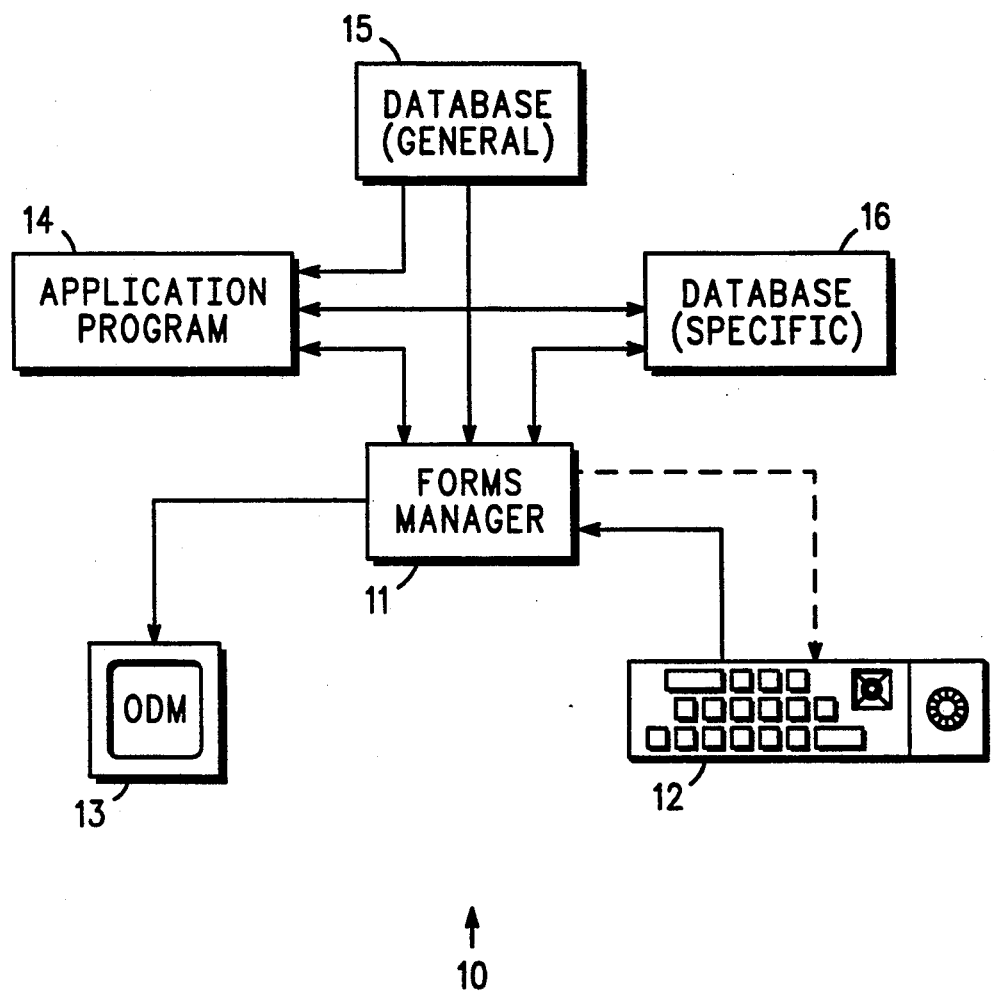
FIG. 1 is a block diagram representing the function of the present invention within a data processing system.

Referring initially to FIG. 1, a block diagram, generally designated 10, representing the function of the present invention within a data processing system is illustrated. A forms manager 11 is used as an interface, or buffer, among and between the input, output, and system applications and databases.

An input device 12 is coupled to forms manager 11. Input device 12 is illustrated as a keyboard with a joy stick but may be any type of input device In general, the communication is from input device 12 to forms manager 11. However, there may be a need for forms manager 11 to operate visual or acoustic devices on input device 11. For this reason, there may be some communication from forms manager 11 to input device 12.

Also coupled to forms manager 11 is an operator display module 13. Display 13 is typically a cathode ray tube, but may be any of numerous types of displays such as the various types of flat panel displays Communication is generally from forms manager 11 to display 13. However, a touch sensitive screen or other type of input device may be incorporated in the system requiring communication from display 13 to forms manager 11.

Forms manager 11 also interacts with the application programs 14 and the databases. The databases, for this particular example, are broken into a general database 15 and a specific database 16. It should be understood that while the database may be functionally separated, both may be contained in the same physical location In operation, objects are entered through input device 12 to the forms manager. This input is checked and stored in database 16 for the particular patient. When a form is to be displayed, forms manager 11 obtains a list of objects to be displayed. One source of objects is application program 14. The forms manager then retrieves the tiles associated with the objects from database 15. The data to be placed in the tiles is then obtained from database 16. Using these inputs, forms manager 11 develops a form which is displayed on display 13.

Figure 2A:
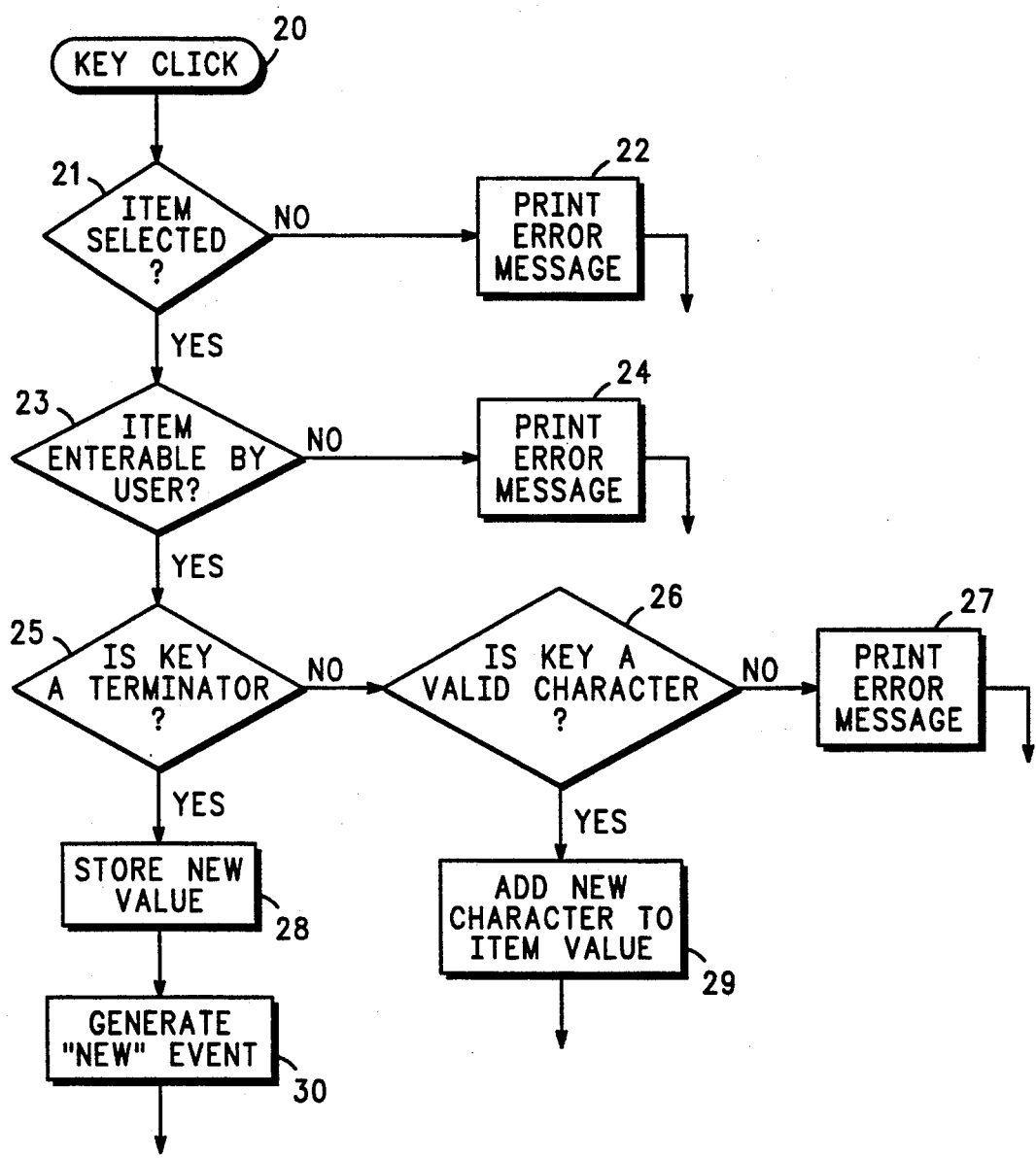
FIG. 2A is a process flow diagram of a keyboard input process embodying the present invention.
Figure 2B:
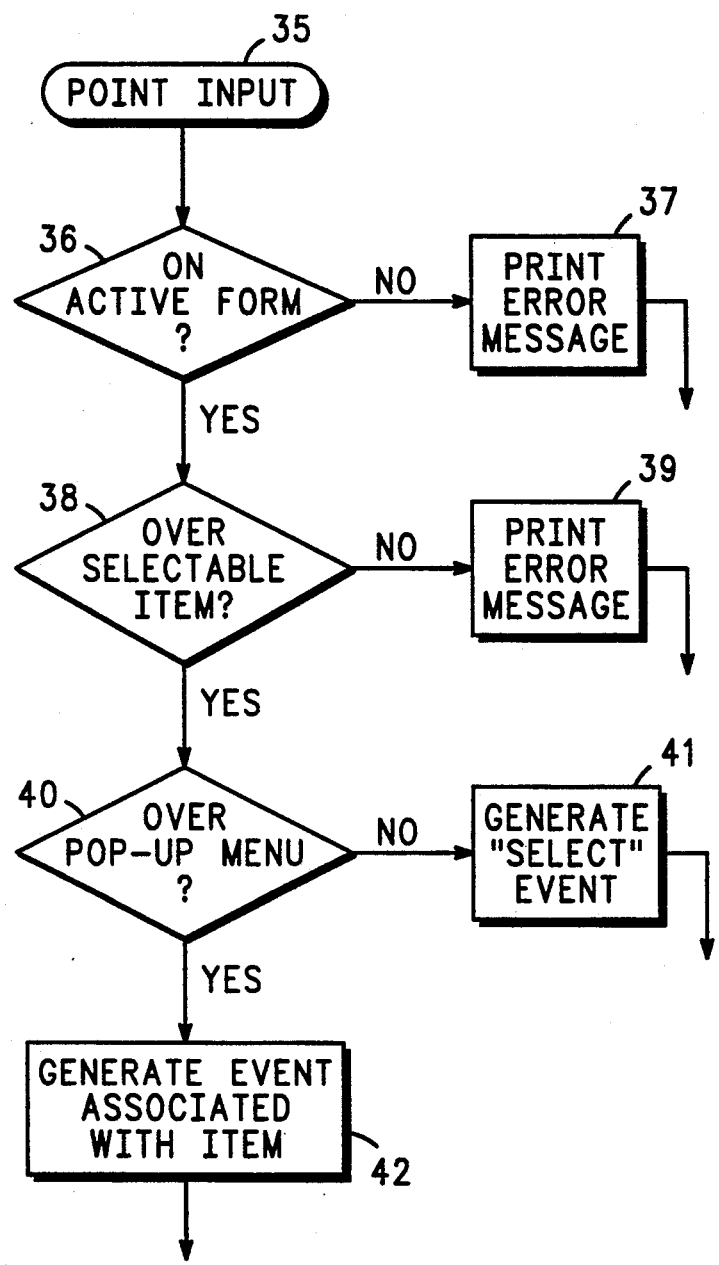
FIG. 2B is a process flow diagram of a pointer input process embodying the present invention.

The input operation of the present invention is illustrated in FIGS. 2A and 2B. A pseudo code listing of the keyboard operation is shown in Appendix A. The line numbers in parentheses refer to code lines in Appendix A. In FIG. 2A, a process flow diagram of a keyboard input process embodying the present invention is illustrated. The process commences with the depression of a key on the keyboard, step 20. The process then proceeds to a decision block 21 where a determination is made as to whether an item on the form has been selected (line 6). If an item has not been selected, the process moves to block 22 where an error message is printed (line 7) and the process exits the routine.

If an item on the form has been selected, the process moves to decision block 23. In decision block 23, the forms manager determines whether the selected item is enterable by the user (line 10). If the item is not enterable by the user, the process moves to block 24 where an error message is printed (line 11). Following the error message, the process exits the routine.

If the item is enterable by the user, the process moves to a decision block 25. In decision block 25, the forms manager determines whether the key was a terminator (line 14) such as a return key, enter key, tab key, or the like. If the key was not a terminator key, the process moves to decision block 26. In decision block 26, the forms manager determines if the key represented a valid character for that item (line 19). By way of example, the item may be limited to numeric input only; in which case any alpha input would be rejected. If the key does not represent a valid character, the process moves to block 27. In block 27 an error message is printed (line 27) and the process exits the routine.

If the key represents a valid character, the process moves to block 29. In block 29, the valid character is appended to an item value for the selected item (line 20-23). The process then exits the routine.

If the key was a terminator, the process moves from decision block 25 to block 28. In block 28 the item value, created in block 29, is stored in a buffer (line 15). Following block 28 is block 30 where a "New Event" signal is generated (line 16) to inform the application that a new item value is present.

A similar process takes place when a pointing device (i.e. mouse, joy stick, roller ball, etc.) is utilized as the input device. This process is illustrated in FIG. 2B which is a flow chart of a pointer input process embodying the present invention. A pseudo code listing for performing this function is contained in Appendix B. The line numbers in parentheses refer to code lines in Appendix B. The processes commences at a block 35 where a pointer input is received.

The process then moves to a decision block 36. In decision block 36, the forms manager determines if the pointer is on an active form (line 5). If the pointer is not in an active form, the process moves to block 37. Block 37 causes an error message to be printed (line 6). The process then exits the routine.

If the pointer is on an active form, the process moves from decision block 36 to decision block 38. In decision block 38 the forms manager determines if the pointer is over a selectable item (line 9). If the item is not selectable, either generally or by that user, the process moves to block 39. Block 39 causes an error message to be printed (line 10). The process then exits the routine.

If the pointer is over a selectable item the process moves from decision block 38 to decision block 40. In decision block 40, the forms manager determines whether the pointer is over a pop-up window (line 13). If the pointer is not over a pop-up window, the process moves to a block 41. In block 41 a "select" event is generated lines (18-27) indicating the item at which the pointer was directed. The select event may permit the entry of data into the item selected or may cause a pop-up menu to be formed.

If the pointer is over a pop-up menu, the process moves from decision block 40 to block 42. Block 42 causes an event associated with the selected item to be generated (line 14). This event may be the entry of data, the correction of previously entered data, a request to show more detail, or the like. Following block 42, the process exits the routine.

The process of entering data by the user is classified as an event. More precisely, an event is a user action or set of user actions which are of interest to the application.

The events are placed in a queue by the forms manager, steps 30 and 42 of FIGS. 2A and 2B, respectively. This queue of events is maintained by the forms manager until acted upon by the applications program. Periodically, the application program will request the next event from the forms manager.

In the output operation, the forms manager is directed to display a particular form containing objects (text/data). In the present invention, the text/data to be displayed dictate the shape of the form rather than the form dictating how the objects are displayed. A sample form, generally designated 50, is illustrated in FIG. 3. Form 50 illustrates two groups of tiles, a vitals group 51 and a labs group 52. Vitals group 51 contains four tiles: a heart rate tile 53, a blood pressure tile 54, a temperature tile 55, and a respiration rate tile 56. The labs group consists of: a CBC/HGB (Complete Blood Count-/HemoGloBin) tile 57, a CBC/HCT (Complete Blood Count/HematoCriT) tile 58, a K+(Potassium) tile 59, a Na (Sodium) tile 60, a BUN (Blood Urea Nitrogen) tile 61, and a CREAT (CREATinine) tile 62.

Each tile 53-62 comprises several cells. For example, heart rate tile 53 has a group cell 53A and a title cell 53B. In a group, such as group 51, the name of the group may or may not be printed. Generally, only the first tile in the group, here tile 53, will designate the group name. Cell 53B contains the title; here the title is "Heart Rate". The remaining cells of tile 53 are data cells 53C. One cell 53C is provided for every time period listed on the display. Cells 53C are spreadsheet type cells in that they repeat with time whereas regions 53A and 53B are non-spreadsheet cells that do not repeat with time. In tile 54, the group cell 54A is left blank since the group is displayed previously. However, the object cell 54B of tile 54 is labeled Blood Pressure. The data cells 54C of tile 54 are then aligned with the time intervals.

There is generally more than one type of tile for each category. One tile 53 may be provided to display its regions in either a horizontal fashion, as in FIG. 3, or in a vertical fashion by a tile 53', as shown in FIG. 4. In this particular embodiment, the tiles are formed of rectangles. Each region in a tile will have the same height in horizontal tiles and the same width in vertical tiles. The height (width) of a horizontal (vertical) tile is determined by the space required by the largest region of the tile. Typically, this cell will be the object region, such as region 54'B, FIG. 4.

In addition to the two standard types of tiles (horizontal and vertical) there may be other tiles displaying the data in different fashions. For example, blood pressure cell 54C will typically display three types of data, X, Y, and Z, representing the high pressure (X), low pressure (Y), and the average pressure (Z). In FIGS. 5A-5C, three different ways are illustrated to display this data. The dimensions of the cells and tiles will vary depending on the display desired Each tile may be designed to contain numerous types of information, both displayed and not displayed. For example, the basic type of information is whether a cell contains data or text. A text (data) cell of a tile can be set to prohibit the entrance of data (text). The physical size and shape of the cell and tile is also maintained in the tile definition. The display rules are in the tile definition indicating, for example, which cell display format (refer to FIGS. 5A-5C) will be used. Each tile also has an associated name and/or ID number with which it is referenced.

Various security measures are also contained within the tile/cells descriptions. These security measures take the form of whether a tile/cell may be accessed and by whom. For example, you would not ordinarily allow access to the group and title cells. These are preset and are to be changed only by the system administrator. In other areas, such as the data areas, you want the general nursing population of the hospital to be able to enter data. However, it would also be desirous to know who entered the data and exactly when it was entered. While the charts may be broken down into half-hour segments, the vitals may not be taken right on the half-hour, so you will want to keep a record of the exact time and who entered the data. An additional security measure is whether data may be changed once it has been entered. While you do not want to have data changed at a later date, it is important that the data illustrated is accurate. Therefore, a tile/cell will retain the original entry and who made it; and the changed data and who made the changes. When a cell is displayed that has had data changed, this region will be offset from the other data by a marker, different color, flashing display, or the like.

The time of the data may be broken down further into when the readings were made and when they were actually entered into the system. The tile/cell definitions may also perform a data integrity check to ensure the entered data is not obviously incorrect. For example, in temperature tile 55, if the temperature 986° C. is accidently entered rather than 98.6° C., the system will recognize this as an error and alert the individual making the entry. In addition, if an entry is outside a normal range, but still valid, this entry may be offset from the rest of the data in a fashion described above with respect to the changed data.

In this particular embodiment, tiles are designed to display the various forms of objects. There is not one tile for each object but one tile for each form of object. When the forms manager seeks to display a particular object, it determines which tile is associated with this object and retrieves that tile. As an example, Potassium (K+) tile 59 and Sodium (Na) tile 60 would be the same form of tile. The difference would be the title displayed in title cells 59B and 60B and the data entered into spreadsheet data cells 59C and 60C.

Another feature of the tiles of the present invention is that a cell of a tile may be associated with a menu of possible actions with event codes. An example of this is provided in FIG. 6. In FIG. 6, the operator has selected cell 65 of temperature tile 55. When this is selected, a pop-up menu will appear, such as menu 70, having the possible actions which may be undertaken in cell 65 of tile 55.

As shown in FIG. 6, menu 70 is illustrated with three options. The first event is to make an entry. This is selected when an entry is first being made to the cell. The second event is to correct an entry. This is selected if the cell has been previously accessed. The third region is labeled "SHOW DETAIL". This region is selected to show the details such as the time of entry, the person who made the entry, or other similar information. As an alternative to the pop-up menus, a series of soft keys may be utilized. This would provide a pop-up, or existing menu window, with a list of keys, generally function keys, that are assigned for one of the events listed above. These soft keys may have different functions assigned by the particular region being accessed A process for generating a form embodying the present invention is illustrated in the flow chart of FIG. 7. This process is illustrated in pseudo code in Appendix C. The following lines contained in parentheses refer to the line numbers of Appendix C. Initially, a request, box 80, for a new form is received by the process (line 3). The system then goes to decision box 81 and decides if there is an object list in existence for this particular form (line 30). If there is no list of objects associated with this form, the process moves to step 82 where an object list is built from the form definition (line 10). An object list may come from three different sources: a list associated with the form; a list entered at the time of the form generation request; or a list provided by an application program.

Once the object list has been generated, the process moves on to step 83 where objects are assigned to tiles (lines 12, 13). For example, if the object is the "Heart Rate", then the tiles would be checked to see which tile was associated with "Heart Rate".

Next, in step 84, the draw point is moved to the top, or some designated home point, of the display (lines 15-17). A decision is then made in step 85 as to whether there are objects/tiles to be drawn (lines 19-20). If there are no tiles to be drawn, the process moves to step 86 and ends. If there are tiles to be drawn, the process moves to step 87 where the object/tile is drawn (lines 21-54). Once drawn, the process moves to step 88 where the draw point is moved to the next position (line 55).

This process would generate a display such as that illustrated in FIG. 3. However, there are generally so many objects which may be monitored for a particular patient, that not all of the objects may be displayed in one screen. Since it is unnecessary to display objects which are not being monitored, the elimination of these objects will leave more room on the display for objects that are being monitored.

As an example, of the objects displayed in FIG. 3, if temperature, CBC/HGB, and CBC/HCT are not being monitored, then display space is being taken up with empty, unutilized space. To avoid this and to provide a more efficient display, the forms manager will not display items that are not being monitored. The display would then appear as shown in FIG. 8. Here, the three objects that are not being utilized have been eliminated and the form adjusted to remove the tiles associated with those objects. This will leave room at the bottom of the display for additional tiles that were not displayed in the form of FIG. 3.

In addition to the above, the forms manager will place the objects in any order specified in the listing of objects that is provided or generated. For example, if a particular doctor prefers to view the blood pressure, tile 54, as the first object, this can be indicated in the form description, and the forms manager, when the display is created, will place this tile first. In addition, the forms manager may be set to inter-mix objects from the various groups if desired. An example of this is illustrated in FIG. 9.

In FIG. 9, the tiles have been arranged by the forms manager in order of a priority that was provided with the description of the form. In a medical setting, there may be one generally form for the hospital used by the nursing staff and a different form for doctors. Further, particularly for specialists who do not desire to see everything or who desire to see certain information (objects) first, there may be forms established for each doctor.

Figure 7:
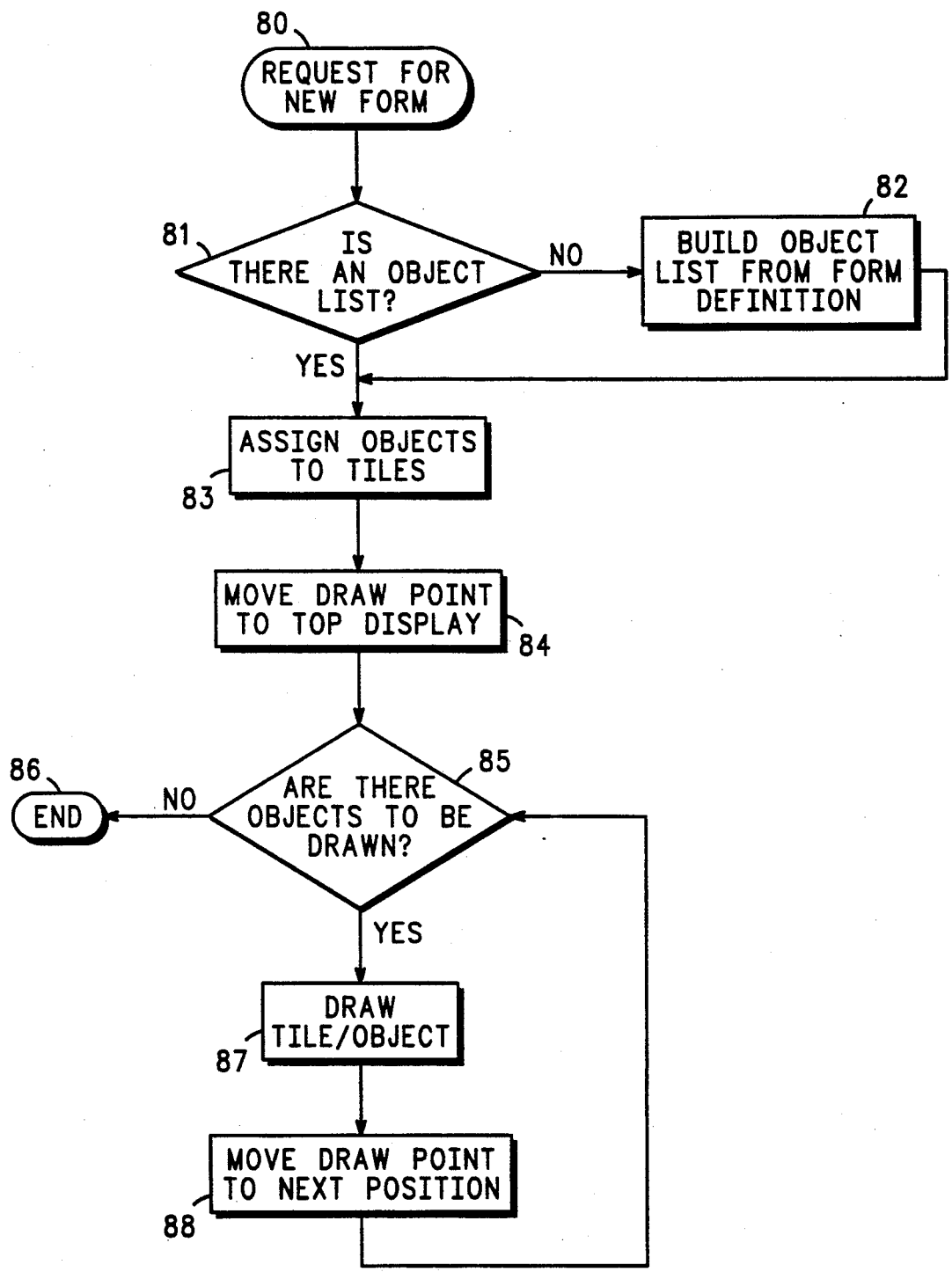
FIG. 7 is a process flow diagram of an output buffer process embodying the present invention.
Figure 10:
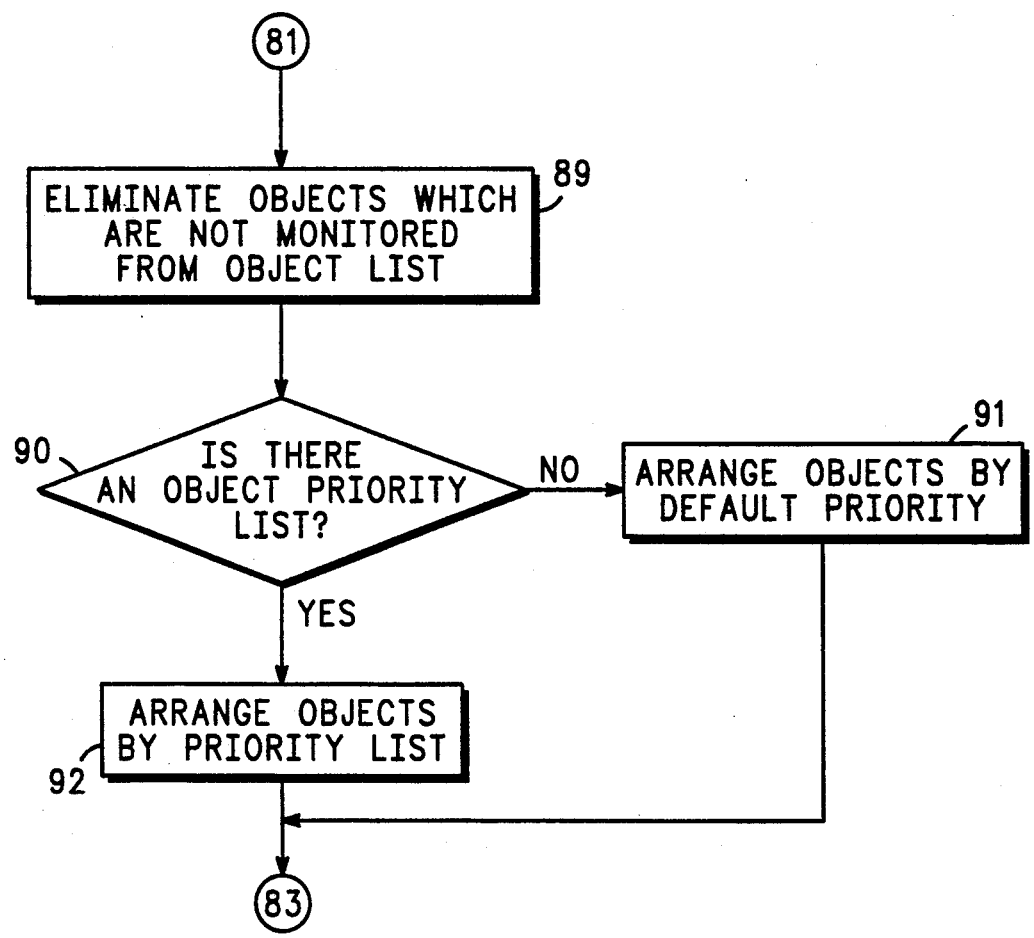
FIG. 10 is a process flow diagram modification to the process flow diagram of FIG. 6.

Therefore, the process of FIG. 7 may be provided with the additional steps shown in FIG. 10. These steps may be inserted between decision step 81 and step 84 and may be in any order desired. Following step 81 is step 89 in which any objects which are not being monitored from the object list are eliminated from the object list. Next, in decision step 90, the process looks to see if there is a priority list associated with the form. If there is no priority list, the process moves to step 91 where a default priority list is used to arrange the objects. If there is a priority list for the form, the process moves to step 92 where the objects are arranged according to the priority list. The process then moves to step 83.

As indicated above, the assignment of objects to tiles, in step 83, may occur before, during, or after the steps set out in FIG. 10.

Therefore, as stated above, the present invention creates a form to fit the objects being displayed rather than fitting the objects to the form.

Thus, it will be apparent to one skilled in the art that there has been provided in accordance with the invention, a process and method that fully satisfy the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

APPENDIX A

```
 2
 3
 4  fm_click(key)
 5
 6     if item not selected
 7        error - "Keyboard inactive when nothing selected"
 8        exit
 9
10     if selected item not enterable
11        error - "Item not enterable"
12        exit
13
14     if key is a terminator
15        store item value in database
16        generate NEW event
17        exit
18
19     else if key is a valid key
20        if this is the first key in this item
21           set item value to blank
22
23        add key to item value
24        exit
25
26     else
27        error - "Invalid key"
28        exit
29
```

APPENDIX B

```
 2
 3  fm_point (position)
 4
 5     if position not on current form
 6        error - "Not on active form"
 7        exit
 8
 9     if position not on selectable item
10        error - "Item not selectable"
11        exit
12
13     if position over popup menu
14        generate action associated with popup menu item
15        exit
16
17     else
18        if there is a currently selected item
19           if position is over selected item
20              generate DESELECT action for item
21
22           else
23              generate DESELECT action for selected item
```

```
24          generate SELECT action for item at position
25
26      else
27          generate SELECT action for item at position
28
29      exit
30
```

APPENDIX C

```
 2
 3  fm_new (form_name, object_list)
 4
 5    read form definition
 6
 7    if object list supplied
 8        make local copy of object list
 9    else
10        create object list from form definition
11
12    for each object in object list
13        find tile in form which displays object
14
15    draw point = (0,0)
16    last tile = NONE
17    last group = NONE
18
19    for each object on object list
20    do
21        set this tile to tile containg object
22        set this group to group containing tile
23
24        if this group != last group
25
26            if last tile != NONE
27                draw end of last tile
28                draw point = end of last tile
29
30            if last group != NONE
31                draw end of last group
32                draw point = end of last group
33
34            last group = this group
35            last tile = this tile
36
37            draw beginning of this group
38            draw point = beginning of this group
39
40            draw beginning of this tile
41            draw point = beginning of this tile
42
43        else if this tile != last tile
44
45            if last tile != NONE
46                draw end of last tile
47                draw point = end of last tile
48
```

```
49          last tile = this tile
50          draw beginning of this tile
51          draw point = beginning of this tile
52
53
54      draw this object
55      draw point = end of object
56   done
57
58   if last tile != NONE
59      draw end of last tile
60      draw point = end of last tile
61
62   if last group != NONE
63      draw end of last group
64
65   exit
```

We claim:

1. In a computer system having input means for entering a plurality of objects to form an object list, data and commands into said system by a system user, an operator display module for displaying information to said user, a memory for storing said data and instructions, and processing means for performing processing operations in response to the entry of said data and said commands by said user, a method for generating a display on said operator display module comprising the steps in sequence of:
   (a) entering a command into said system by said user to display a form;
   (b) in response to said command, using said processing means to obtain said object list, corresponding to said form, from said memory;
   (c) using said processing means, assigning a plurality of tiles to each of said objects in said object list, at least one of said tiles being assigned to a group of said objects, and at least a second of said tiles being assigned to an individual one of said objects; and
   (d) using said processing means, displaying said tiles on said operator display module.

2. The method of claim 1 wherein said step (d) comprises the steps in sequence, using said processing means, of:
   i) moving a draw point to a home position of said operator display module;
   ii) drawing a tile of at least one object if there is an object to be drawn;
   iii) moving said draw point to a next position of said operator display module; and
   iv) repeating steps ii) through iii) until said tiles for all of said objects in said object list have been drawn or until a display area of said operator display module has been filled.

3. The method of claim 1 further comprising the steps, in sequence, between steps (b) and (c), using said processing means, of:
   (b1) eliminating an object from said object list if said object is not currently monitored by said system;
   (b2) obtaining a prioritization list from said memory; and
   (b3) arranging said objects according to said prioritization list.

4. The method of claim 1 wherein in step (c) said at least one tile comprises a text region and a data region.

5. The method of claim 1 wherein at least one of said tiles comprises a definition comprising:
   a physical size and shape of said at least one tile;
   an information display rule;
   an access table for identifying system users who are granted access to said at least one tile;
   a tile name; and
   a storage area for retaining the respective times of entries and identification of a system user making said entries of objects into one or more regions of said at least one tile.

6. The method of claim 1 wherein in step (c) one of said tiles has associated with it a plurality of regions, at least one of said regions comprising a plurality of objects, said method further comprising the step of:
   (e) entering a command into said system by said user to display the contents of said at least one region; and
   (f) using said processing means, displaying a pop-up menu corresponding to said at least one region of said one tile on said operator display module.

7. In a computer system having input means for entering a plurality of objects to form an object list, data and commands into said system by a system user, an operator display module for displaying information to said user, a memory for storing said data and instructions, and processing means for performing processing operations in response to the entry of said data and said commands by said user, a method for generating a display on said operator display module comprising the steps in sequence of:
   (a) entering a command into said system by said user to display a form;
   (b) in response to said command, using said processing means to obtain said object list, corresponding to said form, from said memory;
   (c) using said processing means, eliminating an object from said object list if said object is not a monitored object;
   (d) using said processing means, obtaining a prioritization list, corresponding to said form, from said memory;

(e) using said processing means, prioritizing said object list according to said prioritization list;
(f) using said processing means, assigning a plurality of tiles to each of said objects to be displayed in said object list, at least one of said tiles being assigned to a group of said objects, and at least a second of said tiles being assigned to an individual one of said objects; and
(g) using said processing means, displaying said tiles on said operator display module.

8. The method of claim 7 where step (g) comprises the steps in sequence, using said processing means, of:
  i) moving a draw point to a home position of said operator display module;
  ii) drawing a tile of at least one object if there is an object to be drawn;
  iii) moving said draw point to a next position of said operator display module; and
  iv) repeating steps ii) through iii) until said tiles for all of said objects in said object list have been drawn or until a display area of said operator display module has been filled.

9. The method of claim 7 wherein in step (c) said at least one tile comprises a text region and a data region.

10. The method of claim 7 wherein at least one of said tiles comprises a definition comprising:
  a physical size and shape of said at least one tile;
  an information display rule;
  an access table for identifying system users who are granted access to said at least one tile;
  a tile name; and
  a storage area for retaining the respective times of entries and identification of a system user making said entries of objects into one or more regions of said at least one tile.

11. The method of claim 7 wherein in step (c) one of said tiles has associated with it a plurality of regions, at least one of said regions comprising a plurality of objects, said method further comprising the step of:
  (e) entering a command into said system by said user to display the contents of said at least one region; and
  (f) using said processing means, displaying a pop-up menu corresponding to said at least one region of said one tile on said operator display module.

* * * * *